(12) United States Patent
Tsai et al.

(10) Patent No.: US 7,598,943 B2
(45) Date of Patent: Oct. 6, 2009

(54) RESIZABLE WIRELESS POINTING DEVICE WITH A STORABLE RECEIVER

(76) Inventors: Ming-Hsun Tsai, 20F-B, No. 98, Sec. 1, Sintai 5th Rd., Sijhih City, Taipei County 22102 (TW); Chih-Wen Su, 20F-B, No. 98, Sec. 1, Sintai 5th Rd., Sijhih City, Taipei County 22102 (TW)

( * ) Notice: Subject to any disclaimer, the term of this patent is extended or adjusted under 35 U.S.C. 154(b) by 654 days.

(21) Appl. No.: 11/196,555

(22) Filed: Aug. 2, 2005

(65) Prior Publication Data
US 2006/0158430 A1    Jul. 20, 2006

(30) Foreign Application Priority Data
Jan. 18, 2005   (TW)   .............................. 94101402 A

(51) Int. Cl.
G06F 3/33 (2006.01)
(52) U.S. Cl. .................. 345/163; 345/159; 345/161; 345/164; 345/167
(58) Field of Classification Search .................. 345/8, 345/156–169, 173, 179, 180, 419, 619, 629, 345/638; 250/221; 359/630; 324/207.2
See application file for complete search history.

(56) References Cited

U.S. PATENT DOCUMENTS

| | | | | |
|---|---|---|---|---|
| 5,991,085 A * | 11/1999 | Rallison et al. | ............. | 359/630 |
| 6,137,479 A * | 10/2000 | Olsen et al. | ................. | 345/169 |
| 6,310,606 B1 * | 10/2001 | Armstrong | ................. | 345/161 |
| 6,377,249 B1 * | 4/2002 | Mumford | .................... | 345/179 |
| 6,411,281 B1 * | 6/2002 | Sasselli et al. | ............... | 345/163 |
| 6,525,306 B1 * | 2/2003 | Bohn | ......................... | 250/221 |
| 6,611,139 B1 * | 8/2003 | Jackson | ................... | 324/207.2 |
| 6,909,421 B2 * | 6/2005 | Wang | ......................... | 345/163 |
| 7,072,699 B2 * | 7/2006 | Eiden | ...................... | 455/575.8 |
| 7,079,110 B2 * | 7/2006 | Ledbetter et al. | ............ | 345/156 |
| 2002/0008692 A1 * | 1/2002 | Omura et al. | ............... | 345/173 |
| 2003/0165047 A1 * | 9/2003 | Eiden | ........................ | 361/679 |
| 2003/0179177 A1 * | 9/2003 | Wang | ......................... | 345/156 |
| 2004/0001042 A1 | 1/2004 | Lindhout et al. | | |
| 2004/0046732 A1 * | 3/2004 | Chesters | .................... | 345/156 |
| 2004/0169640 A1 | 9/2004 | Chao et al. | | |
| 2005/0264533 A1 * | 12/2005 | Ledbetter et al. | ............ | 345/163 |
| 2006/0007153 A1 * | 1/2006 | Ledbetter et al. | ............ | 345/163 |

(Continued)

FOREIGN PATENT DOCUMENTS

CN    2347203    11/1999

(Continued)

*Primary Examiner*—Prabodh M Dharia
(74) *Attorney, Agent, or Firm*—Davis Wright Tremaine LLP; Michael J. Donohue; Heather M. Colburn

(57) ABSTRACT

The present invention relates to a resizable wireless pointing device with a storable receiver. The body housing comprises at least one inner compartment which is located next to the back of a wheel and used for storage of the wireless receiver. A sliding cover, located on the top of the body housing, which slides back and forth along the longitude axis of the housing and subsequently alters the size of the wireless pointing device. A shutter, which rolls up following the sliding of the cover, closes seamlessly the gap area between the body housing and the cover, and integrates into the surface of the wireless pointing device.

12 Claims, 4 Drawing Sheets

U.S. PATENT DOCUMENTS

| | | | |
|---|---|---|---|
| 2006/0028442 A1* | 2/2006 | Bynum et al. | 345/157 |
| 2006/0050056 A1* | 3/2006 | Armstrong | 345/161 |
| 2007/0132733 A1* | 6/2007 | Ram | 345/163 |

FOREIGN PATENT DOCUMENTS

| | | |
|---|---|---|
| CN | 2634541 | 8/2004 |
| DE | 20109327 | 8/2001 |
| DE | 20210736 | 7/2002 |
| DE | 202004006825 U1 * | 8/2004 |
| EP | 1359496 | 5/2003 |
| JP | 10-133813 | 5/1998 |
| JP | 10307679 A * | 11/1998 |
| TW | 470194 | 12/2001 |
| TW | M255461 | 1/2005 |
| WO | WO98/43194 | 10/1998 |

* cited by examiner

RESIZABLE WIRELESS POINTING DEVICE WITH A STORABLE RECEIVER

BACKGROUND OF THE INVENTION

1. Field of the Invention

The present invention relates to a wireless pointing device, particularly to a resizable wireless pointing device with a storable receiver.

2. General Background and State of the Art

Any known wireless mouse with storable wireless receiver stores the receivers within its body in a compartment, which is solely used for this purpose.

The present invention overcomes the above limitation of the related arts, and it is an object of the present invention to provide a resizable wireless pointing device with a storable receiver which can further utilize the storage compartment.

SUMMARY

The first objective of the present invention is to provide a resizable wireless pointing device with a storable receiver.

The second objective of the present invention is to provide a resizable wireless pointing device.

To achieve the purpose of this present invention, the present invention provides a resizable wireless pointing device with a storable receiver which comprises a wireless receiver; a body housing which contains at least one inner compartment, is located next to the back of a wheel and is used for storage of the wireless receiver; a sliding cover, located on the top of the body housing, which slides back and forth along the longitude axis of the housing and subsequently alters the size of the wireless pointing device; and a shutter, which rolls up following the sliding of the cover, closes seamlessly the gap area between the body housing and the cover, and integrates into the surface of said wireless pointing device.

BRIEF DESCRIPTION OF THE DRAWINGS

Aspects of the present invention are illustrated by way of example, and not by way of limitation, in the accompanying drawings, wherein.

DETAILED DESCRIPTION OF THE PREFERRED EMBODIMENT

Figure 1:
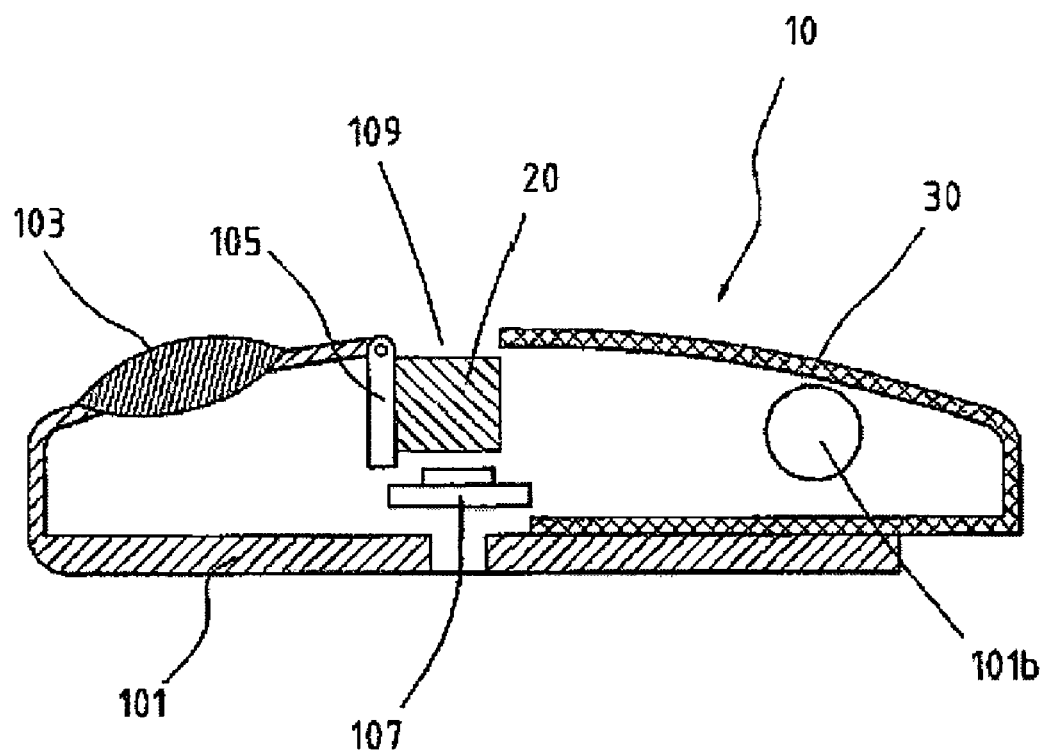
FIG. 1 presents a side cross-sectional view of a resizable wireless pointing device with a storable receiver of the present invention.
Figure 2:
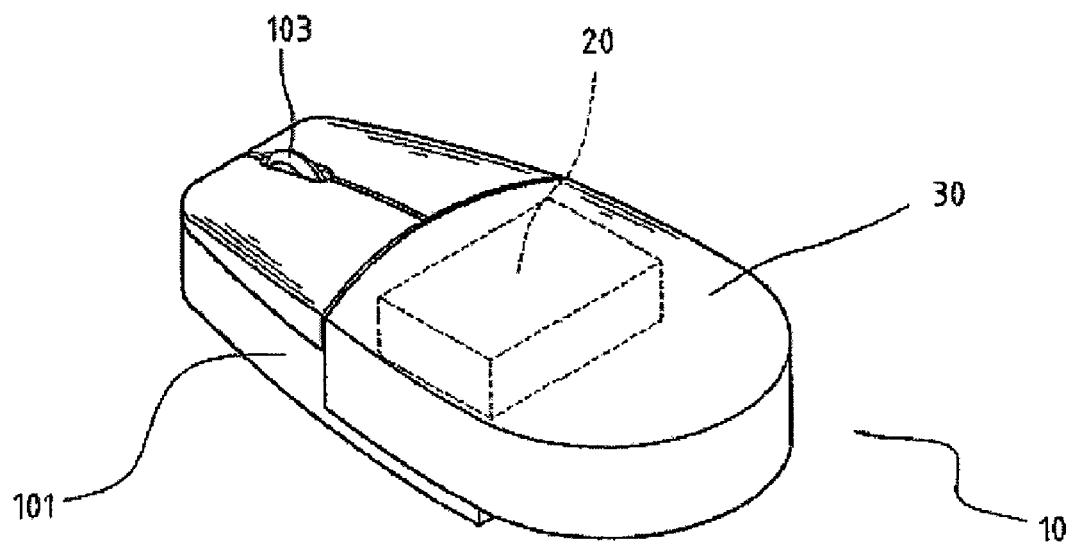
FIG. 2 is a three-dimensional perspective view showing the wireless pointing device of the present invention.

FIG. 1 presents a side cross-sectional view of the resizable wireless pointing device with a storable receiver of the present invention. And FIG. 2 is a three-dimensional perspective view showing the wireless pointing device of the present invention. The resizable wireless pointing device with a receiver 10 of the present invention comprises: a wireless receiver 20, a sliding cover 30, the body housing 101, a shutter 105; all of which are described in further details wherein.

As shown in FIG. 1, the body housing 101 comprises at least one inner compartment 101a, where a wireless receiver 20 would be stored. The wireless receiver 20 is retrieved or put back by a user who would first push backward the sliding cover 30. This way a gap area 109 would be created in between the sliding cover 30 and the body housing 101. Therefore, the wireless receiver 20 is retrieved or put back through the gap area 109. The first inner compartment 101a is used for storage of the wireless receiver 20 and is located next to the back of the wheel 103. The sliding cover 30 sits on the top of the body housing 101 and slides back and forth along the longitude axis of the housing 101. The moving of the sliding cover 30 subsequently alters the size of the wireless pointing device 10. This enables the wireless pointing device to be size-adjustable to accommodate different hand sizes, determined by the size of a user's palm and the operation space needed for an application such as a USB wireless receiver.

As shown in FIG. 2, after the wireless receiver 20 is put back into the first inner compartment 101a, it is completely hidden in the housing of the compartment 101a. A user stores the wireless receiver 20 by pushing forward the sliding cover 30. Thus the gap area 109 diminishes and finally the sliding cover 30 is in direct contact of the body housing 101.

Figure 3:
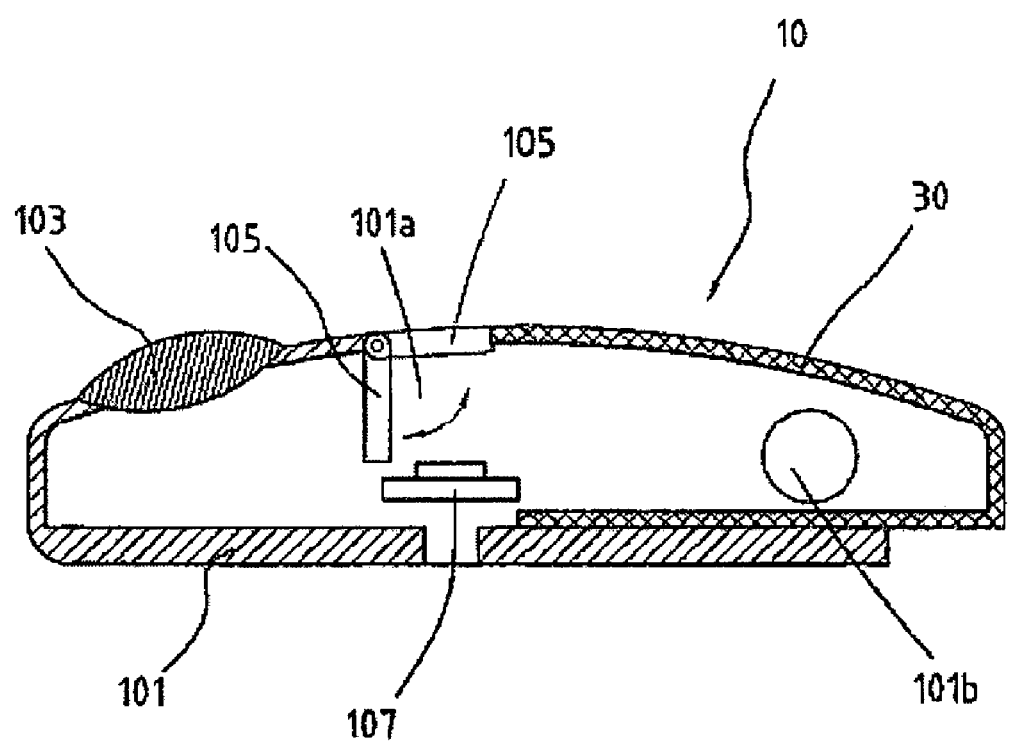
FIG. 3 is a side cross-sectional view of the wireless pointing device of the present invention in operation.

FIG. 3 is a side cross-sectional view of the wireless pointing device of the present invention in operation. Following a user retrieves the wireless receiver 20 from the first inner compartment 101a, the shutter 105 rolls up, contacts with both the body housing 101 and the sliding cover 30, and closes seamlessly the gap area 109. Thus, the exposed shutter 105 integrates into the surface of the wireless pointing device when the device is in operation.

Figure 4:
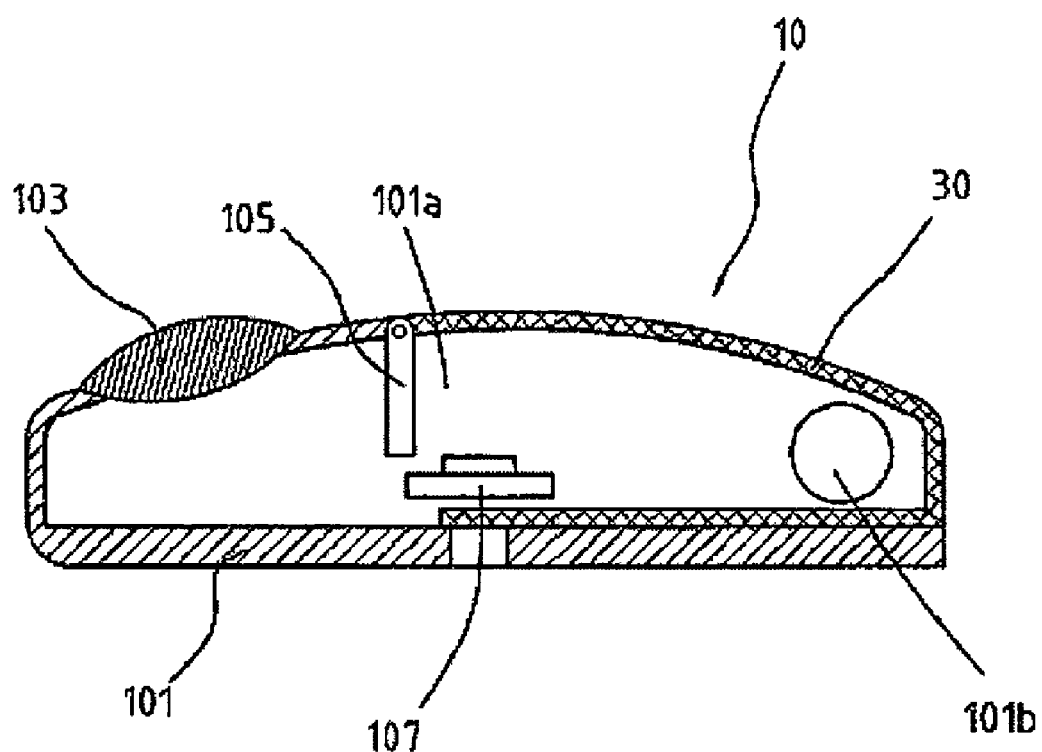
FIG. 4 is a side cross-sectional view of the wireless pointing device of the present invention in another operation.

FIG. 4 is a side cross-sectional view of the wireless pointing device of the present invention in another operation. Following a user retrieves the wireless receiver 20 from the first inner compartment 101a, the shutter 105 stays in the first inner compartment 101a. Then the user could push the sliding cover 30 toward the wheel 103. The sliding cover 30 completely covers the gap area 103 located above the first inner compartment 101a. Thus, the sliding cover 30 integrates into the surface of the wireless pointing device 10 when the device is in operation and of changed size.

The body housing 101 of the present invention could further comprise a second inner compartment for storage of batteries. The wireless pointing device 10 could further comprise a sensor 107 to detect the traveling of the wireless pointing device 10 and the displacement signal used for measuring any relative movement. Furthermore, the wireless pointing device 10 of the present invention can further comprise a sliding apparatus (not shown) which is located at the junction of the body housing 101 and the sliding cover 30 and ensures that the sliding cover 30 moves on and along the longitude axis of the housing 101.

The novel technology of the present invention breathes structural characteristic into the wireless pointing device 10 such as the first inner compartment 101a in the body housing 101. Particularly, a cover 30, placed on top of the body housing 101 was designed to slide back and forth along the longitude axis of the body housing 101 and subsequently, is able to change the size of the wireless pointing device 10. Further, the gap area 109 created by the movement of the cover 30, could be closed with either the shutter 105 or the cover 30.

It is our intention to make the wireless pointing device 10 of the present invention resizable. The cover 30 can slide back and forth along the longitude axis of the body housing 101 and make stops at more than two positions. In consequence, the wireless pointing device 10 is changed into more than two different sizes. At the same time, depending on the different positions of the cover 30, the gap area 109 is changed to different sizes which can be covered with the shutter 105 of more than two different lengths.

The wireless pointing device of the present invention has advantage and advancement of dual functions: capable of storing a wireless receiver and changing the size of its operation part; and surpasses any known wireless pointing device of single signal-receiving function.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A resizable wireless pointing device with a storable receiver, comprising:
    a wireless receiver;
    a body housing, containing at least one inner compartment which is located next to the back of a wheel and used for storage of said wireless receiver;
    a sliding cover, located on the top of said body housing, which slides back and forth along the longitude axis of said housing and subsequently alters the size of said wireless pointing device; and
    a shutter, which rolls up following the sliding of said cover, closes seamlessly the gap area between said body housing and said cover, and integrates into the surface of said wireless pointing device.

2. A resizable wireless pointing device with a storable receiver, comprising:
    a wireless receiver;
    a body housing, containing one inner compartment which is used for storage of said wireless receiver;
    a sliding cover, located on the top of said body housing, which slides back and forth along the longitude axis of said housing and subsequently alters the size of said wireless pointing device; and
    a shutter, which rolls up following the sliding of said cover, closes seamlessly the gap area between said body housing and said cover, and integrates into the surface of said wireless pointing device.

3. A wireless pointing device as in any of claims 1 or 2, wherein said wireless receiver is a USB wireless receiver.

4. A wireless pointing device as in claim 2, wherein said inner compartment is located right next to the back of said wheel.

5. A wireless pointing device, comprising:
    a body housing;
    a sliding cover, located on the top of said body housing, which slides back and forth along the longitude axis of said housing and subsequently alters the size of said wireless pointing device; and
    a shutter, which rolls up following the sliding of said cover, closes seamlessly the gap area between said body housing and said cover, and integrates into the surface of said wireless pointing device.

6. A wireless pointing device, comprising:
    a body housing;
    a sliding cover configured to slide back and forth along a longitude axis of said housing between a first cover position and a second cover position to alter a size of the wireless pointing device, wherein the wireless pointing device is operational in the first cover position and in the second cover position; and
    a shutter pivotably coupled to the body housing and configured to pivot between a first shutter position when the sliding cover is in first cover position and a second shutter position when the sliding cover is in the second cover position.

7. A wireless pointing device as in any of claims 1, 2, 5 or 6, wherein said sliding cover can slide back and forth along the longitude axis of said housing, make stops at more than two positions, and subsequently alters said wireless pointing device into at least two different sizes.

8. A wireless pointing device as in any of claims 1, 2, or 5, wherein said shutter can extend to more than two different lengths to fit into different sizes of said gap area.

9. A wireless pointing device as in any of claims 1, 2, 5 or 6, wherein said body housing further comprises a second compartment for storage of a battery.

10. A wireless pointing device as in any of claims 1, 2, 5, or 6, further comprising: a sliding apparatus located at the junction of said body housing and said sliding cover, wherein said sliding apparatus ensures that said sliding cover moves on and along the longitude axis of said housing.

11. A wireless pointing device as in any of claims 1, 2, 5, or 6, further comprising: a sensor to detect the traveling of said wireless pointing device and the displacement signal used for measuring any relative movement.

12. A wireless pointing device as in any of claims 1, 2, 5, or 6, wherein said wireless pointing device is a wireless mouse.

* * * * *

UNITED STATES PATENT AND TRADEMARK OFFICE
CERTIFICATE OF CORRECTION

PATENT NO. : 7,598,943 B2  Page 1 of 1
APPLICATION NO. : 11/196555
DATED : October 6, 2009
INVENTOR(S) : Ming-Hsun Tsai et al.

It is certified that error appears in the above-identified patent and that said Letters Patent is hereby corrected as shown below:

Claim 6, at column 4, line 24, should read:

sliding cover is in <u>the</u> first cover position and a second

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,598,943 B2 Page 1 of 1
APPLICATION NO. : 11/196555
DATED : October 6, 2009
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this

Twenty-eighth Day of September, 2010

David J. Kappos
*Director of the United States Patent and Trademark Office*